United States Patent
Grant et al.

(10) Patent No.: US 6,721,862 B2
(45) Date of Patent: Apr. 13, 2004

(54) METHOD AND CIRCUIT FOR REPLICATING DATA IN A FIBER CHANNEL NETWORK, OR THE LIKE

(75) Inventors: Robert Grant, Toronto (CA); Stephen Trevitt, Gormley (CA)

(73) Assignee: McData Corporation, Broomfield, CO (US)

( * ) Notice: Subject to any disclaimer, the term of this patent is extended or adjusted under 35 U.S.C. 154(b) by 377 days.

(21) Appl. No.: 09/938,313

(22) Filed: Aug. 23, 2001

(65) Prior Publication Data

US 2002/0042866 A1 Apr. 11, 2002

Related U.S. Application Data

(60) Provisional application No. 60/239,736, filed on Oct. 11, 2000.

(51) Int. Cl.[7] .............................................. G06F 13/00
(52) U.S. Cl. ........................... 711/162; 711/112; 714/6; 707/204
(58) Field of Search ................................. 711/162, 112; 714/6; 707/204; 395/341.1

(56) References Cited

U.S. PATENT DOCUMENTS

| | | | |
|---|---|---|---|
| 5,212,784 A | | 5/1993 | Sparks |
| 5,241,668 A | * | 8/1993 | Eastridge et al. ............... 714/5 |
| 5,276,860 A | * | 1/1994 | Fortier et al. ................... 714/6 |
| 5,720,026 A | * | 2/1998 | Uemura et al. ................. 714/6 |
| 5,757,642 A | | 5/1998 | Jones |
| 5,758,359 A | * | 5/1998 | Saxon .......................... 707/204 |
| 6,000,020 A | * | 12/1999 | Chin et al. .................. 711/162 |
| 6,101,585 A | * | 8/2000 | Brown et al. ................ 711/162 |
| 6,260,120 B1 | | 7/2001 | Blumenau et al. |
| 6,282,610 B1 | | 8/2001 | Bergsten |
| 6,460,113 B1 | * | 10/2002 | Schubert et al. ............. 711/111 |
| 6,629,264 B1 | * | 9/2003 | Sicola et al. ................... 714/15 |
| 2002/0049778 A1 | * | 4/2002 | Bell et al. .................... 707/200 |
| 2002/0091710 A1 | * | 7/2002 | Dunham et al. ............ 707/200 |
| 2002/0191649 A1 | * | 12/2002 | Woodring ................... 370/906 |
| 2002/0199073 A1 | * | 12/2002 | Tamura et al. .............. 711/162 |

OTHER PUBLICATIONS

"Legato Celestra Power", Legato Systems, Inc., © 2000, www.legato.com.
PCT International Search Report for PCT/US01/28510, Dec. 31, 2001.

* cited by examiner

*Primary Examiner*—Hong Kim
(74) *Attorney, Agent, or Firm*—Hogan & Hartson L.L.P.

(57) ABSTRACT

A Fiber Channel circuit (150) has a Fiber Channel switch (152) that receives data frames on input ports (142) and writes the frames to a data storage device (158) from an output port (156) A port server (162) backs up the frames to a data storage backup device (160) by reading data volumes from the data storage device (158) and writing backup copies of at least some of the read data volumes to the data storage backup device (160) A data monitor (166) receives the frame data from the output port and applies it to the data storage device (158) The data monitor (166) also applies it to the port server (162) The port server (162) identifies frames in the volume that have been changed during the backup process. The identified frames are either reread from the data storage array (158), or from a memory (168) associated with the port server (162), and written to the data storage backup device (160).

41 Claims, 2 Drawing Sheets

METHOD AND CIRCUIT FOR REPLICATING DATA IN A FIBER CHANNEL NETWORK, OR THE LIKE

CROSS REFERENCE TO RELATED APPLICATIONS

This application claims priority from provisional patent application serial No. 60/239,736, filed Oct. 11, 2000, which is hereby incorporated herein by reference.

BACKGROUND OF THE INVENTION

1. Field of the Invention

This invention relates to improvements in methods and circuits for backing up data, and, more particularly, to improvements in methods and circuits for reliably and safely backing up selected data during the operation of a network of the type which has a data monitoring facility and includes at least a block-level storage protocol, or the like, and, still more particularly, to improvements in methods and circuits for reliably and safely backing up selected data during the operation of a Fibre Channel switch, or the like.

2. Relevant Background

Mainframes, supercomputers, mass storage systems, workstations and very high-resolution display subsystems are frequently connected together to facilitate file and print sharing. Common networks and channels used for these types of connections oftentimes introduce communications bottlenecking, especially in cases where the data is in a large file format typical of graphically-based applications.

There are two basic types of data communications connections between processors and between a processor and peripherals: channels and networks. A "channel" provides a direct or switched point-to-point connection between communicating devices. The primary task of a channel is to transport data at the highest possible data rate with the least amount of delay. Channels typically perform simple error correction in hardware. A "network", by contrast, is an aggregation of distributed nodes (e.g. workstations, mass storage units) with its own protocol, which supports interaction among these nodes. Typically, each node contends for the transmission medium, and each node must be capable of recognizing error conditions on the network and must provide the error management required to recover from the error conditions.

One type of communications interconnect that has been developed is Fibre Channel. The Fibre Channel protocol was developed and adopted as the American Nation Standard for Information Systems (ANSI). See Fibre Channel Physical and Signaling Interface, Revision 4 2, American National Standard for Information Systems (ANSI) (1993) for a detailed discussion of the Fibre Channel standard. Briefly, Fibre Channel is a switched protocol that allows concurrent communication among workstations, supercomputers, and various peripherals. The total network bandwidth provided by Fibre Channel is on the order of tens or hundreds of gigabits per second. Fibre Channel is capable of transmitting frames at rates exceeding 1 gigabit per second simultaneously in both directions. It is also able to transport commands and data according to existing protocols such as Internet protocol (IP), small computer system interface (SCSI), high performance parallel interface (HIPPI), and intelligent peripheral interface (IPI) over optical fiber or copper cable.

FIG. 1 illustrates a variable-length frame 11, as described by the Fibre Channel standard. The variable-length frame 11 comprises a 4-byte start-of-frame (SOF) indicator 12, which is a particular binary sequence indicative of the beginning of the frame 11. The SOF indicator 12 is followed by a 24-byte header, which generally specifies, among other things, the frame source address, the destination address, as well as whether the frame 11 is either control information or actual data.

The header 14 is followed by a field 16 of variable-length data. The length of the data frame 16 is 2112 bytes. The data 16 is followed successively by a 4-byte CRC (cyclical redundancy check) code 17 for error detection, and by a 4-byte end-of-frame (EOF) indicator 18. The frame 11 of FIG. 1 is much more flexible than a fixed frame, and provides for higher performance by accommodating the specific needs of specific applications.

FIG. 2 illustrates a block diagram of a representative Fibre Channel architecture in a Fibre Channel network 100. As an example of the architecture, a workstation 120, a mainframe 122, and a supercomputer 124 are interconnected with various subsystems via a Fibre Channel fabric 110 (i.e., a Fibre Channel switch). The subsystems may include, for example, a tape subsystem 126, a disk subsystem 128, and a display subsystem 130. The fabric 110 is an entity that interconnects various node-ports (N_ports) 140 and their associated workstations.

Mainframes and peripherals are attached to the fabric 110 through the fabric ports (F_ports) 142. The essential function of the fabric 110 is to receive frames of data from a source N_port, and, using a first protocol, to route the frames to a destination N_port. In a preferred embodiment, the first protocol is the Fibre Channel protocol. Other protocols, such as the asynchronous transfer mode (ATM) also can be used.

Thus, the Fibre Channel is a channel-network hybrid, containing enough network features to provide the needed connectivity, distance, and protocol multiplexing, and enough channel features to retain simplicity, repeatable performance, and reliable delivery. The Fibre Channel 110 allows for an active, intelligent interconnection scheme, known as a "fabric," or Fiber Channel switch, to connect devices. The fabric includes a plurality of (F_ports) that provide for interconnection and frame transfer between a plurality of (N_ports) attached to associated devices that may include workstations, supercomputers and/or peripherals. The fabric has the capability of routing frames based upon information contained within the frames. The N_ports manages the simple point-to-point connections between themselves and the fabric. The type of N_ports and their associated devices dictates the rate that the N_ports transmit and receive data to and from the fabric. Transmission is isolated from the control protocol so that different topologies, such as point-to-point links, rings, multidrop buses, cross point switches, and the like, can be implemented.

The Fibre Channel industry standard also provides for several different types of data transfers. A class 1 transfer requires circuit switching, that is, a reserved data path through the network switch. Class 1 transfers generally involve the transfer of more than one frame, oftentimes numerous frames, between two identified network elements. In contrast, a class 2 transfer requires an allocation of a path through the network switch for each transfer of a single frame from one network element to another. Frame switching for class 2 transfers is more difficult to implement than class 1 circuit switching, as frame switching requires a memory mechanism for temporarily storing incoming frames in a source queue prior to their routing to a destination port, or a destination queue at a destination port. A memory mechanism typically includes numerous input/output (I/O) connections with associated support circuitry and queuing logic.

Additional complexity and hardware is required when channels carrying data at different bit rates are to be interfaced.

It is known to employ centralized queuing that is inherently slow, as a common block of logic must be employed, for all routing decisions within the switch. It is also known to employ distributed source queuing and distributed destination queuing.

In the past, mirroring operations have been employed to replicate data traversing a Fibre Channel switch. However, such multicast operations generally place the frame replicator directly in the path of the data, so that when a backup occurs, if a write is detected in the data to be backed up, the backup is put on hold until the write is completed.

SUMMARY OF THE INVENTION

In light of the above, therefore, it is an object of the invention to provide an improved method and circuit for use in backing up data frames in conjunction with a Fibre Channel switch.

To perform the data backup, a volume of data is replicated from a storage device using a reliable multicast protocol provided by a switched Fibre Channel storage area network. The majority of the replication takes place while an application continues to operate on the volume. While copying the data from the volume to be replicated, a port server monitors the application traffic to the storage device via a multicast protocol. If, after copying a particular block of data, the port server identifies a write to that block of data in the monitored traffic, the port server will mark that block of data as "dirty." Once all blocks of data in the volume have been read, the port server returns to the start and begins rereading the "dirty" blocks, still monitoring the traffic to the storage device. Once the list of "dirty" blocks is deemed sufficiently small, the port server stops the application and completes the rereading of the "dirty" blocks. The resulting volume replica is then available for use for other applications, such as but not limited to backup, remote replication, data migration, or the like.

Thus, according to a broad aspect of the invention, A network of the type which has a data monitoring facility and includes at least a block-level storage protocol is provided. The network includes data input and output ports, a storage device for storing data frames, a backup storage device, a port server, and a data monitor for receiving data frames from an output port and applying the data frames to the data storage device, and at least an identification thereof to the port server.

The storage device may be, for example, a data storage array, a data storage disk, or the like. The port server is configured to backup data frames from the storage device to the backup storage device, to identify data frames that have been changed during the backup, and to rewrite the identified frames to the data storage backup device. The port server may include a memory so that the data monitor applies an entire data frame to the port server memory. The port server may be configured to identify data frames that have been changed during the backup, and to rewrite the identified frames to the data storage backup device from the port server memory.

Alternatively, the port server may include a memory for receiving frame identification data from the data monitor. The port server may be configured to identify data frames that have been changed during the backup, and to rewrite the identified frames to the data storage backup device from the data storage device. If desired, the port server may be further configured to determine if a first predetermined criteria has occurred and to affect an application that is running until a second predetermined criteria has occurred. Examples of such criteria may be the occurrence of a first predetermined quantity of data having been identified as having been changed, or that a particular number of data frames have been changed, that a particular time of day has occurred, or the like.

According to another broad aspect of the invention, a circuit is provided for use in association with a Fibre Channel network of the type having a Fibre Channel switch configured to receive Fibre Channel data frames on an input port for writing via an output port to a data storage device. The circuit includes a data storage device for receiving data from the output port of the Fibre Channel switch and a data storage backup device. A port server is provided, the port server being configured to perform a data backup process to backup data in the data storage device to the data storage backup device. The backup process is performed by reading data volumes from the data storage device and writing backup copies of at least some of the read data volumes to the data storage backup device. In one embodiment, a data monitor is provided for receiving Fibre Channel data frames from the output port and applying the data frames to the data storage device and at least an identification of the data frames, in a first embodiment, or the entire data frames, in a second embodiment, to the port server.

In the first embodiment, the port server is further configured to identify blocks or logical blocks in the volume that have been changed during the backup process as indicated by the data frames sent by the data monitor to the port server, and to reread the identified frames from the data storage array and write the reread frames to the data storage backup device. In the second embodiment, the port server includes a port server memory to save the Fibre Channel data frames applied thereto and is further configured to identify frames in the volume that have been changed during the backup process as indicated by the data frames sent by the data monitor to the port server. The port server then writes the identified frames from the port server memory to the data storage backup device.

According to another broad aspect of the invention, a method is provided for backing up data in association with a Fibre Channel network of the type having a Fibre Channel switch configured to receive Fibre Channel data frames on an input port for writing via an output port to a data storage device. The method includes issuing a command from a port server to the Fibre Channel switch to create a data frame group that includes a data storage device and the port server. The Fibre Channel data frames are written from the output port of the Fibre Channel switch to the data storage device, and, in a third embodiment, at least frame identification portions of which are written to the port server. In a fourth embodiment, Fibre Channel data frames are written from the output port of the Fibre Channel switch both to the data storage device and to the port server. The port server is operated to perform a data backup process to backup data in at least a portion of the data storage device to the data storage backup device.

In the third embodiment, the backup process includes reading predetermined data volumes from the data storage device and writing backup copies of the read data volumes to the data storage backup device. Fibre Channel data frames written to the port server which are within the predetermined data volumes read from the data storage device to be backed up are identified, and the identified Fibre Channel frames are reread from the data storage device and written to the data storage backup device.

In the fourth embodiment, predetermined data volumes are read from the data storage device and backup copies of the read data volumes are written to the data storage backup device. Fibre Channel data frames written during the data backup process to the port server which are within the predetermined data volumes read from the data storage device to be backed up are identified, and the identified Fibre Channel frames are written from the port server to the data storage backup device.

In a fifth embodiment, frames in either direction, i.e., frames destined either for the data storage device or for the original source of the TO may be are sent to the port server.

BRIEF DESCRIPTION OF THE DRAWINGS

The invention is illustrated in the accompanying drawing, in which.

In the various figures of the drawing, like reference numerals are used to denote like or similar parts.

DETAILED DESCRIPTION OF A PREFERRED EMBODIMENT

Figure 1:
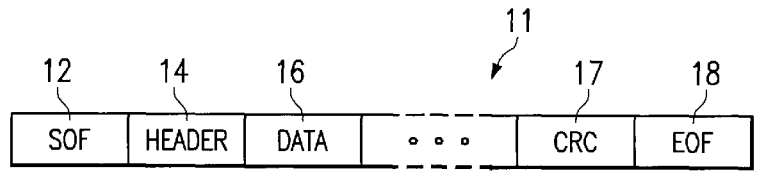
FIG. 1 shows a variable-length frame, as described by the Fibre Channel standard, according to the prior art.
Figure 2:
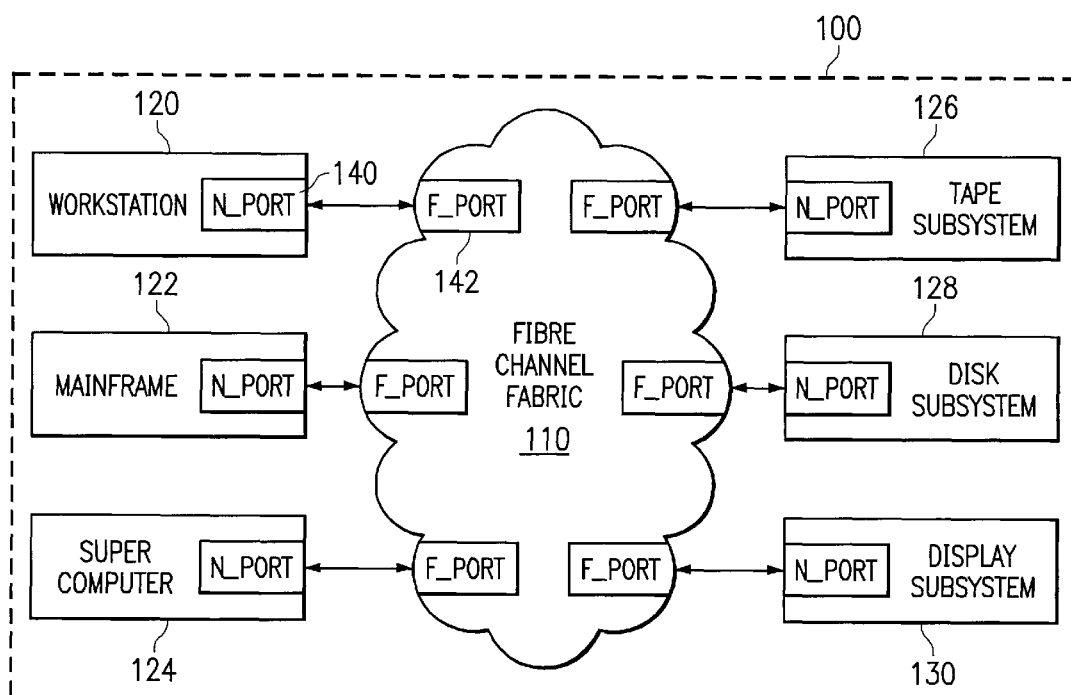
FIG. 2 shows a block diagram of a representative Fibre Channel architecture in a Fibre Channel network, according to the prior art.
Figure 3:
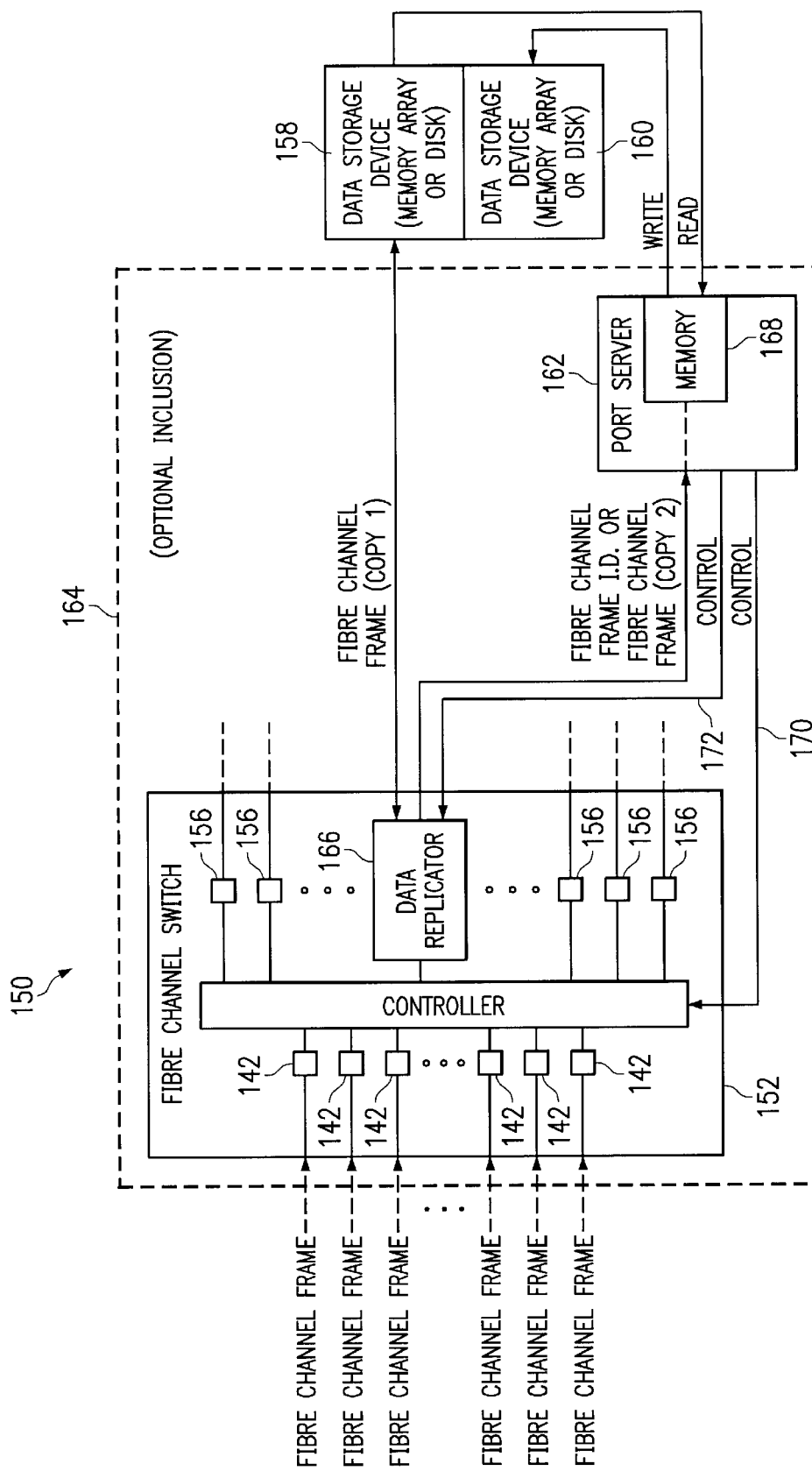
FIG. 3 is a block diagram of a circuit for backing up selected data during the operation of a Fibre Channel switch, or the like, according to a broad aspect of the present invention.

A Fibre Channel network 150 having a data backup system, according to a preferred embodiment of the invention, is shown in FIG. 3, to which reference is now made. The Fibre Channel network 150 includes a Fibre Channel switch 152, which has a plurality of data input ports 142 connected to receive Fibre Channel frames from a workstation, mainframe, supercomputer, or other source, as described above. The Fiber channel switch also includes a plurality of output ports 156 to which the Fibre Channel frames are properly directed.

In the embodiment illustrated, the Fibre Channel network 150 has an associated circuit, which includes a storage device 158 for storing Fibre Channel data frames from a selected one of the output ports 156. It should be noted that the data storage device 158 may also supply data to the associated output port of the Fibre Channel switch 152. A backup storage device 160 is provided for containing a backup copy of the data, or selected portion thereof. The storage device 158 and the backup storage device 160 may be, for example, solid-state memory arrays, tape subsystems, disk subsystems, or other suitable data memory.

A port server 162 is provided to backup the data, or portion thereof, from the data storage device 158 to the backup storage device 160. The port server 162 is configured to perform the data backup process by reading data volumes from the data storage device 158 and writing backup copies of at least some of the read data volumes to the data storage backup device 160. The port server 162 optionally may be provided as an internal part of the Fibre Channel switch 152, or provided separately for external connection thereto, as indicated by the dotted lines 164.

A data monitor 166, which is referred to herein as a data replicator, is provided to receive data frames from an output port of the switch, replicate it, and apply them both to the data storage device 158 and to a memory device 168 associated with the port server 162. The memory device 168 may be internal to the port server 162, as shown, or externally provided. As will become apparent below, either the entire Fibre Channel frames may be applied to the memory 168, or an identification portion of the frames may be applied, depending upon the mode of operation of the port server 162. In operation, the port server 162 is configured to backup data frames from the storage device 158 to the backup storage device 160, to identify data blocks that have been changed during the backup, and to rewrite the identified frames to the data storage backup device.

In one embodiment, the port server 162 is configured to identify data frames that have been changed during the backup, and to rewrite the identified frames to the data storage backup device from the port server memory 162, in which the entire changed data frames have been written. If only identification data has been written to the memory 168, according to the second embodiment described, the port server 162 is configured to read the identified frames from the data storage device 158 and to rewrite the identified frames to the data storage backup device 160.

If desired, the port server 162 may be further configured to determine if a first predetermined criteria has occurred and to affect an application that is running until a second predetermined criteria has occurred. For example, the application may be stopped entirely if the first predetermined criterion occurs, or, alternatively, an I/O of the application may be stopped if the first predetermined criteria occurs. The first predetermined criteria may be, for example, that a predetermined number of the frames have been identified as having been changed. Alternatively, the criteria may be a particular time of day, or some other event. The second predetermined criteria may be, for example, the occurrence of a second predetermined number of the frames that have been rewritten to the data backup storage array. Thus, for instance, during the backup process, if too many data frames are identified as having been changed, the application that is running may be stopped, or its I/O stopped, until a predetermined number of the frames have been rewritten to the backup memory 160.

As shown, control lines 170 and 172 may be provided from the port server 162 to the controller 174 of the Fibre Channel switch 152 and the data replicator 166 to control their operation.

In operation of the Fibre Channel network 150, to perform the data backup, I/O frames are replicated from a storage device using a reliable multicast protocol provided by a switched Fibre Channel storage area network. The majority of the replication takes place while an application continues to operate on the volume. While copying the data from the volume to be replicated, the port server 162 monitors the application traffic to the storage device via the backup protocol. If, after copying a particular block of data, the port server 162 identifies a write to that block of data in the monitored traffic, the port server marks that block of data as "dirty," and either an identification of the data, or all of the data, is written to the memory 168 associated with the port server 162.

Once all blocks of data in the volume have been read, the port server 162 returns to the start and begins rereading the "dirty" blocks, still monitoring the traffic to the storage device. Once the list of "dirty" blocks is deemed sufficiently small, the port server, if desired, may stop the application and complete the rereading of the "dirty" blocks. The resulting volume replica is then available for use for other applications, such as backup, remote replication, data migration, or the like.

More particularly, a command may be issued from the port server 162 to the Fibre Channel switch 152 to create a data frame group that includes the data storage device 158 and the port server 162. In response, Fibre Channel data frames are written from the output port of the Fibre Channel switch 152 to both the data storage device 158 and at least frame identification portions to the port server 162.

The port server 162 is then operated to perform a data backup process to backup a data volume in at least a portion of the data storage device 158 to the data storage backup device 160. The backup process is performed by reading predetermined data volumes from the data storage device 158 and writing backup copies of the read data volumes to the data storage backup device 160. During the backup process, Fiber Channel data frames are continually written to the data storage device 158, despite the fact that they may be different from the volume being backed up in the process. The new frames are nevertheless written to the data storage device, but the frame identification data are also written to the memory 168 associated with the port server 162.

After the data volume has been backed up, except for the newly written frames, the newly written frames that are identified in the memory 168 associated with the port server 162 are reread from the data storage device 158 and rewritten to the data storage backup device 160.

In an alternative embodiment, the entire data frames are written to the memory 168 associated with the port server 162. The port server is then operated, after the initial backup with the original data in the volume being backed up, to write the identified Fibre Channel frames from the memory 168 associated with the port server 162, without rereading the data storage device 158, to the data storage backup device.

Although the invention has been illustrated with the data replicator copying the data being written to the data storage device 158, it should be noted that it may also be employed to copy frames moving in the return path (i.e., towards the host). For example, a SCSI/FCP response from the storage device also may be monitored, rather than just relying on, for example, a data timeout. Thus, the data in both directions may be replicated, if desired.

One problem that should be addressed is the dilemma of detecting a replicated frame that is dropped transparently to the port server 162. This is a rare occurrence, which may occur, for example, if a bit error on the link going to the port server corrupts an SOF. If the frame were corrupted, the port server 162 would know its current replica is invalid. One mechanism that the port server 162 may use is to start the data movement over. On the other hand, a recovery mechanism may be to implement a protocol session in which a frame or I/O count is provided by the Fibre Channel switch 152 to the port server 162 at the end of the session. This may be implemented using the "CNTL" lines 170 and 172 shown.

Such protocol session may include, for example, authenticating the port server 162 to the Fiber Channel switch 152. The source and destination points (using the SID and DID) of a protocol session may then be requested. If too many corruptions of Fibre Channel frames are detected, the port server 162 may then terminate the backup session. The port server 162 may also terminate the session if it detects too many denials of a replicated frame, in order to avoid stopping application traffic due to a problem with the server link. Finally, the server of the Fibre Channel switch 152 may return a frame count, or perhaps a SCSI write count, upon termination of the backup session to the data replicator port 166. This would allow the port server 162 to detect dropped frames or I/Os during the session by comparing it with the number it processed.

Although the invention has been described and illustrated with regard to a specific Fibre Channel switch embodiment, it should be understood that the principles of the invention may be equally advantageously employed with regard to networks of the type which have a data monitoring facility and includes at least a block-level storage protocol, or the like. Examples of such networks, for instance, include SCSI-on-VI over Infiniband (for example the SRP protocol as defined by the ANSI T10 committee), SCSI-on-IP over Ethernet (for example iSCSI as defined by the Internet Engineering Task Force), or other "switched packet networks". More particularly, rather than using internal proprietary bus protocols, the invention provides for a "snoopcast" protocol. This solution can be replicated across many storage devices at once, for example, including storage devices of different vendors. This is in contrast to prior art solutions, which can be extended only as far as the bus goes (or some proprietary long-distance protocol can extend it).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A network of the type which has a data monitoring facility and includes at least a block-level storage protocol, comprising:

data input and output ports;

a storage device for storing data frames;

a backup storage device;

a port server; and a data monitor for receiving data frames from an output port and applying said data frames to said data storage device, and at least an identification thereof to said port server, said port server being configured to backup data frames from said storage device to said backup storage device, to identify data frames that have been changed during said backup, and to rewrite said identified frames to said data storage backup device.

2. The network of claim 1 wherein said storage device is a data storage array.

3. The network of claim 1 wherein said storage device is a data storage disk.

4. The network of claim 1 wherein said port server comprises a memory and wherein said data monitor applies an entire data frame to said port server memory, and wherein said port server is configured to identify data frames that have been changed during said backup, and to rewrite said identified frames to said data storage backup device from said port server memory.

5. The network of claim 1 wherein said port server comprises a memory for receiving frame identification data from said data monitor, and wherein said port server is configured to identify data frames that have been changed during said backup, and to rewrite said identified frames to said data storage backup device from said data storage device.

6. The network of claim 1 wherein said port server is further configured to determine if a first predetermined criteria has occurred and to affect an application that is running until a second predetermined criteria has occurred.

7. The network of claim 6 wherein said application is stopped if said first predetermined criteria occurs.

8. The network of claim 6 wherein an I/O of said application is stopped if said first predetermined criteria occurs.

9. The network of claim 6 wherein said first predetermined criteria is a first predetermined quantity of data has been identified as having been changed, and said second predetermined criteria is the occurrence of a second predetermined quantity of data has been rewritten to said data backup storage array.

10. The network of claim 6 wherein said first predetermined criteria is a particular number of data frames.

11. The network of claim 6 wherein said first predetermined criteria is a particular time of day.

12. A Fibre Channel network, comprising:
    a Fibre Channel switch having data input and output ports;
    a storage device for storing Fibre Channel data frames;
    a backup storage device;
    a port server; and
    a data monitor for receiving data frames from an output port of said switch and applying said data frames to said data storage device, and at least an identification thereof to said port server,
said port server being configured to backup data frames from said storage device to said backup storage device, to identify data frames that have been changed during said backup, and to rewrite said identified frames to said data storage backup device.

13. The circuit of claim 12 wherein said storage device is a data storage array.

14. The circuit of claim 12 wherein said storage device is a data storage disk.

15. The circuit of claim 12 wherein said port server comprises a memory and wherein said data monitor applies an entire data frame to said port server memory, and wherein said port server is configured to identify data frames that have been changed during said backup, and to rewrite said identified frames to said data storage backup device from said port server memory.

16. The circuit of claim 12 wherein said port server comprises:
    a memory for receiving frame identification data from said data monitor, and wherein said port server is configured to identify data frames that have been changed during said backup, and to rewrite said identified frames to said data storage backup device from said data storage device.

17. The circuit of claim 12 wherein said port server is further configured to determine if a first predetermined criteria has occurred and to affect an application that is running until a second predetermined criteria has occurred.

18. The circuit of claim 17 wherein said application is stopped if said first predetermined criteria occurs.

19. The circuit of claim 17 wherein an I/O of said application is stopped if said first predetermined criteria occurs.

20. The circuit of claim 17 wherein said first predetermined criteria is a first predetermined quantity of data has been identified as having been changed, and said second predetermined criteria is the occurrence of a second predetermined quantity of data has been rewritten to said data backup storage array.

21. The circuit of claim 17 wherein said first predetermined criteria is a particular number of data frames.

22. The circuit of claim 17 wherein said first predetermined criteria is a particular time of day.

23. A circuit for use in association with a Fibre Channel network of the type having a Fibre Channel switch configured to receive Fibre Channel data frames on an input port for writing via an output port to a data storage device, comprising:
    a data storage device for receiving data from said output port of said Fibre Channel switch;
    a data storage backup device;
    a port server configured to perform a data backup process to backup data in said data storage device to said data storage backup device by reading data volumes from said data storage device and writing backup copies of at least some of said read data volumes to said data storage backup device; and
    a data monitor for receiving Fibre Channel data frames from said output port and applying said data frames to said data storage device and at least an identification of said data frames to said port server,
    said port server being further configured to identify frames in said volume that have been changed during said backup process as indicated by the data frames sent by said data monitor to said port server, and to reread said identified frames from said data storage array and write said reread frames to said data storage backup device.

24. The circuit of claim 23 wherein said data storage device is a data storage array.

25. The circuit of claim 23 wherein said data storage device is a data storage disk.

26. The circuit of claim 23 wherein said port server is further configured to determine if a first predetermined criteria has occurred and to affect an application that is running until a second predetermined criteria has occurred.

27. The circuit of claim 26 wherein said application is stopped if said first predetermined criteria occurs.

28. The circuit of claim 26 wherein an I/O of said application is stopped if said first predetermined criteria occurs.

29. The circuit of claim 26 wherein said first predetermined criteria is a first predetermined quantity of data has been identified as having been changed, and said second predetermined criteria is the occurrence of a second predetermined quantity of data has been reread from said data storage array and written to said data storage backup array.

30. The circuit of claim 26 wherein said first predetermined criteria is a predetermined number of data frames.

31. The circuit of claim 26 wherein said first predetermined criteria is a particular time of day.

32. A circuit for use in association with a Fibre Channel network of the type having a Fibre Channel switch configured to receive Fibre Channel data frames on an input port for writing via an output port to a data storage device, comprising:
    a data storage device for receiving data from said output port of said Fibre Channel switch;
    a data storage backup device;
    a port server configured to perform a data backup process to backup data in said data storage device to said data storage backup device by reading data volumes from said data storage device and writing backup copies of at least some of said read data volumes to said data storage backup device; and a data monitor for receiving Fibre Channel data frames from said output port and applying said data frames to said data storage device and to said port server, said port server comprising a port server memory to save said Fibre Channel data frames applied thereto and being further configured to identify frames in said volume that have been changed during said backup process as indicated by the data frames sent by said data monitor to said port server, and to write said identified frames from said port server memory to said data storage backup device.

33. The circuit of claim 32 wherein said data storage device is a data storage array.

34. The circuit of claim 32 wherein said data storage device is a data storage disk.

35. The circuit of claim 32 wherein said port server is further configured to determine if a first predetermined quantity of data has been identified as having been changed and to stop any application that is running until a second predetermined quantify of data has been written from said port server memory to said data storage backup device.

36. The circuit of claim 32 wherein said first predetermined criteria is a predetermined number of data frames.

37. The circuit of claim 32 wherein said first predetermined criteria is a particular time of day.

38. The circuit of claim 35 wherein said application is stopped if said first predetermined criteria occurs.

39. The circuit of claim 35 wherein an I/O of said application is stopped if said first predetermined criteria occurs.

40. A method for backing up data in association with a Fibre Channel network of the type having a Fibre Channel switch configured to receive Fibre Channel data frames on an input port for writing via an output port to a data storage device, comprising:

issuing a command from a port server to said Fibre Channel switch to create a data frame group that includes a data storage device and said port server, wherein Fibre Channel data frames are written from said output port of said Fibre Channel switch to said data storage device and at least frame identification portions of which are written to said port server;

operating said port server to perform a data backup process to backup data in at least a portion of said data storage device to said data storage backup device, including:

reading predetermined data volumes from said data storage device and writing backup copies of said read data volumes to said data storage backup device;

identifying Fibre Channel data frames written to said port server which are within the predetermined data volumes read from said data storage device to be backed up; and rereading said identified Fibre Channel frames from said data storage device and writing said reread Fibre Channel frames to said data storage backup device.

41. A method for backing up data in association with a Fibre Channel network of the type having a Fibre Channel switch configured to receive Fibre Channel data frames on an input port for writing via an output port to a data storage device, comprising:

issuing a command from a port server to said Fibre Channel switch to create a data frame group that includes a data storage device and said port server, wherein Fibre Channel data frames are written from said output port of said Fibre Channel switch both to said data storage device and to said port server;

operating said port server to perform a data backup process to backup data in at least a portion of said data storage device to said data storage backup device, including:

reading predetermined data volumes from said data storage device and writing backup copies of said read data volumes to said data storage backup device;

identifying Fibre Channel data frames written during said data backup process to said port server which are within the predetermined data volumes read from said data storage device to be backed up; and writing said identified Fibre Channel frames from said port server to said data storage backup device.

* * * * *